ly yield is obtained of the solid dimer.

UNITED STATES PATENT OFFICE 2,433,372

METHOD OF MAKING A SOLID DIMER OF ALPHA-METHYL PARA-METHYL STYRENE

Bernard H. Kress, New York, N. Y., assignor to Federal Telephone and Radio Corporation, New York, N. Y., a corporation of Delaware No Drawing. Application March 13, 1945, Serial No. 582,578

10 Claims. (Cl. 260—669)

This invention relates to a new dimer of alpha-methyl para-methyl styrene and its method of preparation. Dimeric alpha-methyl para-methyl (AMPM) styrene is known in liquid form and the desirability of producing this substance in a form which is solid under normal working conditions has been recognized. Such a solid form is produced in accordance with my invention and is a polymer which is distinguished from formerly known comparable polymers in being a white crystalline solid. It is insoluble in water, either cold or hot, but has substantial solubility in many organic solvents. It is of utility both alone as a coating material or may be compounded with other substances such as synthetic and natural resins, plastics and like materials to form compounds of varied utility.

The invention also comprehends the novel method by which the solid dimer is prepared. This method can be carried out at moderate temperatures and atmospheric pressure although an increase in pressure may result in greater yields, less side-reactions and greater speed of reaction.

To describe the invention in the method, reference is made to the following outline of preferred procedure which is however merely an exemplification which might be modified within the scope of the invention.

An important factor in the production of the solid dimer as distinguished from the liquid dimer appears to reside in the temperature at which the reaction takes place and the control of this temperature as the reaction proceeds.

A suitable quantity of monomeric liquid alpha-methyl para-methyl styrene (AMPM styrene, hereinafter referred to as "Monomer") is brought up to at least 150° C. in an oil bath. There is then added from two to ten percent by weight of a catalyst, for example, an activated diatomaceous earth such as fuller's earth and floridin. Suitable activation results from heating fuller's earth or the like in the air for approximately two hours at from 300 to 350° C.

During the mixing and subsequently the material is stirred rapidly. A vigorous exothermic reaction ensues at atmospheric pressure and the temperature will rise markedly unless controlled. It is desirable that the temperature reach 200° C. in order to carry out an efficient production. However it should be kept at or below 250° C. to produce the maximum yield of the solid dimer.

The refraction index $N_D^{20}$ may reach 1.5600 on completion of the dimerization and this may be used to measure the end point. However, the index may not rise so high but reach a lower maximum despite continued heating at 250° C. In this case the reaction is complete when the index of the dimer no longer rises.

After the reaction has ceased the liquified reaction mixture is filtered hot from the catalyst. The residue on cooling sets to a crystalline mass which is then purified either by distillation or crystallization. A yield of from 90 to 95% is obtained. The product is a white crystalline solid having a melting point of 40–41° C. and a molecular weight of 264 corresponding to the formula $C_{20}H_{24}$.

The dimer is insoluble in either hot or cold water. It is partially soluble in methanol and freely soluble in varying proportions in many common organic solvents including carbon tetrachloride, isopropanol, ethyl acetate, benzene, hexane, cyclohexane, acetone, ether, dioxane, and nitroethane.

Instead of starting with the monomer as outlined above, the solid dimer may be produced from the liquid form of dimer which is described and claimed in the copending application of A. J. Warner et al., filed December 21, 1943, Serial No. 515,168. This liquid dimer is formed in yields of from 70 to 95 percent by reaction with a catalyst such as activated fuller's earth, floridin and the like at temperatures not exceeding 200° C.

The liquid dimer, preferably isolated from impurities, is used in place of the AMPM styrene to carry out the above described reaction. Other details of the procedure are the same. It will be recognized that the conversion from the liquid dimer to the solid dimer occurs when the temperature of the former is raised above approximately 200° C. In other words, maintenance of the lower temperature, such as described in the above mentioned application of Warner et al., results in the production of the liquid dimer and a higher temperature accomplishes the conversion into the solid dimer.

Accordingly the liquid dimer is used in carrying out the invention by reaction with a suitable catalyst. Here again from two to ten per cent of a suitable catalyst, preferably an activated fuller's earth such as activated floridin is added to the liquid dimer with vigorous stirring. The reaction ensues while a temperature of 200 to 300° C. is maintained. To prevent possible decomposition it is preferred to keep the temperature below 250° C. The heating is continued for several hours, for example from six to eight hours. At the conclusion of the reaction, determined as above indicated, a high yield, from 90% to a quantitative 100% is attained and the solid dimer separated and purified as indicated above.

The above description of the novel solid dimer and the preferred method of its preparation has been set out by way of example only and the invention is to be construed as limited only by the scope of the following claims.

What I claim is:

1. The method of preparing solid dimeric alpha-methyl para-methyl styrene which comprises heating alpha-methyl para-methyl styrene at a temperature within the range of 200° to 250° C. with stirring when mixed with a clay-type catalyst.

2. The method of preparing solid dimeric alpha-methyl para-methyl styrene which comprises heating alpha-methyl para-methyl styrene at a temperature within the range of 200° to 250° C. with stirring when mixed with a thermally activated diatomaceous earth.

3. The method of preparing solid dimeric alpha-methyl para-methyl styrene which comprises heating alpha-methyl para-methyl styrene at a temperature within the range of 200° to 250° C. with stirring when mixed with a thermally activated fuller's earth.

4. The method of preparing solid dimeric alpha-methyl para-methyl styrene which comprises heating alpha-methyl para-methyl styrene at a temperature within the range of 200° to 250° C. with stirring when mixed with floridin.

5. The method of preparing solid dimeric alpha-methyl para-methyl styrene which comprises heating monomeric alpha-methyl para-methyl styrene at a temperature within the range of 200° to 250° C. with stirring when mixed with a thermally activated clay-type catalyst.

6. The method of preparing solid dimeric alpha-methyl para-methyl styrene which comprises heating liquid dimeric alpha-methyl para-methyl styrene at a temperature within the range of 200° to 250° C. with stirring when mixed with a thermally activated clay-type catalyst.

7. The method of preparing solid dimeric alpha-methyl para-methyl styrene which comprises heating alpha-methyl para-methyl styrene at a temperature between 200 and 250° C. for several hours under atmospheric pressure while mixed with from two to ten percent of a thermally activated diatomaceous earth.

8. The method of preparing solid dimeric alpha-methyl para-methyl styrene which comprises heating alpha-methyl para-methyl styrene at a temperature between 200 and 250° C. for several hours under atmospheric pressure while mixed with from two to ten percent of a thermally activated fuller's earth.

9. The method of preparing solid dimeric alpha-methyl para-methyl styrene which comprises heating alpha-methyl para-methyl styrene at a temperature between 200 and 250° C. for several hours under atmospheric pressure while mixed with from two to ten percent of a thermally activated floridin.

10. The method of preparing solid dimeric alpha-methyl para-methyl styrene which comprises heating alpha-methyl para-methyl styrene at a temperature between 200 and 250° C. for several hours under atmospheric pressure while mixed with from two to ten percent of a thermally activated diatomaceous earth, filtering while hot and purifying the filtrate.

BERNARD H. KRESS.

REFERENCES CITED

The following references are of record in the file of this patent:

Staudinger et al., Berichte, vol. 62 (1929), pages 442–452 (11 pages). (Patent Office Library, 260–91.)

Chem. Abst., vol. 23 (1929), page 3213 (1 page). (Patent Office Library.)

Stanley, "The Polymerization . . . a-Methyl Styrene," Chem. & Industry, vol. 17 (Dec. 16, 1939), pages 1080–1083 (4 pages). (Patent Office Library, 260–91.)

Beil, 5, 654 (No. 7), (1922). (Copy in Division 6.)